United States Patent Office 3,766,168
Patented Oct. 16, 1973

3,766,168
N⁶-(CHLOROBUTEN - 2 - YL)-ADENOSINES AND
PROCESSES FOR THE PREPARATION THEREOF
Helmut Vorbruggen, Berlin, Germany, assignor to
Schering Aktiengesellschaft, Berlin, Germany
No Drawing. Filed Dec. 2, 1970, Ser. No. 94,624
Claims priority, application Germany, Dec. 12, 1969,
P 19 62 387.1
Int. Cl. C07d 51/54
U.S. Cl. 260—211.5 R    3 Claims

ABSTRACT OF THE DISCLOSURE

Cis- and trans-isomers of $N^6$ - (3 - chlorobuten - 2-yl)-adenosine of the formula

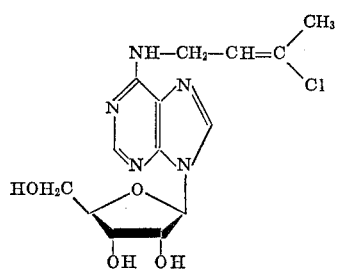

possess anti-inflammatory activity.

BACKGROUND OF THE INVENTION

This invention relates to $N^6$-substituted-adenosines and to processes for the preparation thereof.

It has been known that $N^6$-(isopenten-2-yl)-adenosine inhibits the growth of cellular tumors, both in vitro and in vivo, and of *E. coli,* and also exhibits good regressive effects in leukemia, Proc. Am Assoc. Cancer Res. 8, 23 (1967); 9 69 (1968).

It also possesses an immunosuppressive and a cytokinin activity, Biochemistry, 6, 1937 (1967) and Proc. Natl. Acad. Sci. U.S., 56, 709 (1966).

SUMMARY OF THE INVENTION

This invention relates to compounds of the formula

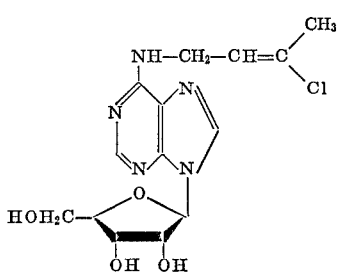

and to pharmacological compositions comprising them, to processes for their production and to their use as anti-inflammatory agents.

These $N^6$-(3-chlorobuten-2-yl)-adenosines possess substantially greater effectiveness with respect to the above-described activity than the conventional $N^6$-(isopenten-2-yl)-adenosine, and their effectiveness is of longer duration. In addition, these $N^6$-(3-chlorobuten-2-yl)-adenosines also possess anti-inflammatory activity comparable to phenylbutazone, but are less toxic. The trans- and cis-isomers of $N^6$-(3-chlorobuten-2-yl)-adenosine exhibit an $LD_{50}$ per os of 1,430–2,950 mg./kg., whereas phenylbutazone exhibits an $LD_{50}$ per os of 370–529 mg./kg. (acute toxicity), as determined in rats.

This invention also relates to processes for the preparation of $N^6$-(3-chlorobuten-2-yl)-adenosines wherein (a) 3-chlorobuten-3-ylamine is reacted with 6-chloronebularine in the presence of a base, preferably a tertiary amine, or
(b) adenosine is reacted with 1,3-dichlorobutene-2 and with a base, simultaneously or successively.

Reaction (a) can be conducted at from 0° C. to 50° C., preferably about room temperature. The reaction is conducted in the presence of a base which neutralizes the hydrogen chloride produced but is otherwise inert. Preferred are trialkylamines. Suitable tertiary amines are, for example, triethylamine and ethyldiisopropylamine.

Reaction (b) can be conducted as a single-stage or as a two-stage process. In the single-stage process, adenosine is reacted with the 1,3-dichlorobutene-2 in the presence of a base in a solvent, preferably dimethylformamide, at a temperature of about 80° C. A preferred base is potassium carbonate. Other examples are the carbonates of sodium, lithium or ammonia.

The $N^6$-(3-chlorobuten-2-yl)-adenosine can be isolated from the reaction mixture in accordance with conventional methods.

In the two-stage process, adenosine is first reacted with 1,3-dichlorobutene-2 in an organic solvent, preferably dimethylformamide, at a temperature of about 80° C. The solvent is removed under vacuum, and the reaction product is thereafter rearranged with a base into $N^6$-(3-chlorobuten-2-yl)-adenosine. The preferred base is ammonia. Other examples are methylamine, ethylamine, ethanolamine and diethylamine.

$N^6$-(3-chlorobuten-2-yl)-adenosine can be administered in the pharmaceutically customary forms of application. The compound can be employed orally, intravenously, intraperitoneally, intramuscularly and topically, e.g., as an anti-inflammatory agent.

The compounds of this invention are formulated so as to provide, for example, 0.1–0.5 g. of the effective agent in admixture with 0.1 to 5 g. of a pharmacologically indifferent excipient, i.e., a pharmaceutically acceptable carrier, per unit dosage, e.g., per tablet.

The novel effective agents are usually administered in amounts of between 0.01 and 2.0 g. per patient per day.

For external use, solutions, liniments, salves, creams, and jellies can, for example, be utilized.

The proportion of the effective substance in the aqueous or alcoholic solution is approximately 1–5%. Inert thickeners, such as hydroxyethylcellulose and polyvinylpyrrolidone, can be added to the aqueous solution. Gels can be produced with the sodium salt of polyacrylic acid. To the alcoholic solution, glycerin can be added as a thickener, for example. Oily solutions employed as eye drops preferably contain 0.5–2% of the effective agent and a bacteriostat, e.g., about 0.25% chloramphenicol. Fatty salves preferably contain 1–10% of $N^6$-(3-chlorobuten-2-yl)-adenosine. As a preservative and an antibacterially effective agent, 2–3% of 5,7-dichloro-8-hydroxyquinaldine can be added to the fatty salve.

For external application, about 0.5–20 g. of a topical composition containing 5% of the effective agent is preferably administered daily.

For the production of tablets or dragées, the effective agents are mixed with the additives, vehicles, and flavor-ameliorating agents customary in galenic pharmacy. In order to obtain types of drugs which are resistant to gastric juices, the cores can be coated with various protective layers made up of a material inert thereto but soluble in the intestinal fluids. Such a suitable material is, for example, cellulose acetate phthalate.

The average daily oral dosage is about 0.02–20 mg./kg. of body weight.

Without further elaboration, it is believed that one skilled in the art can, using the preceding description,

3 utilize the present invention to its fullest extent. The following preferred specific embodiments are, therefore, to be construed as merely illustrative, and not limitative of the remainder of the disclosure in any way whatsoever.

Example 1

(a) 2.866 g. of 6-chloronebularine (10 millimols) and 1.35 g. of 3-chloro-trans-buten-2-ylamine (12.8 millimols) are dissolved, under ice cooling, in 30 ml. of absolute dimethylformamide (DMF) and 4 ml. of triethylamine is added thereto. The mixture is agitated for 3 days at room temperature. The thus-precipitated triethylamine hydrochloride (0.758 g.) is then filtered off, the precipitate is washed with a small amount of DMF, and the filtrate is concentrated to dryness at 40° C./0.01 torr. [mm. Hg]. The residue is recrystallized from ethanol, thus yielding 2.875 g. (81% of theory) of $N^6$-(3-chloro-trans-buten-2-yl)-adenosine, M.P. 162–163° C.

Analysis ($C_{14}H_{18}ClN_5O_4$).—Calculated (percent): C, 47.26; H, 5.10; N, 19.69; Cl, 9.96. Found (percent): C, 46.97; H, 5.53; N, 19.84; Cl, 9.50.

(b) Following the same procedure, 3-chloro-cis-buten-2-ylamine is reacted with 6-chloronebularine to give $N^6$-(3-chloro-cis-buten-2-yl)-adenosine in an 85% yield, M.P. 157–158° C.

Example 2

(a) 13.35 g. of adenosine (50 millimols) is dissolved, while heating to 70° C., in 175 ml. of absolute dimethylformamide and the solution is heated with 18.75 g. of 1,3-dichloro-trans-butene-2 (150 millimols) and 20.7 g. of $K_2CO_3$ (150 millimols; finely pulverized) at 80° C. under a nitrogen atmosphere for 14 hours. The inorganic salts are filtered off and washed with ethyl acetate, and the combined filtrates are evaporated under a water-jet aspirator vacuum. The residue (19.9 g.) is dissolved in chloroform and chromatographed on 400 g. of silica gel. With chloroform-methanol (99:1), 6.9 g. (38.5% of theory) of crystalline $N^6$-(3-chloro-trans-buten-2-yl)-adenosine (M.P. 161–163° C.) is eluted.

Alternatively, the reaction residue (19.9 g.) is extracted with ethyl acetate and the ethyl acetate extracts extracted with $H_2O$. The aqueous phase is separated and then treated with carbon to remove colored impurities. After evaporation of the aqueous phase and dissolution of the residue in ethanol, $N^6$-(3-chloro-trans-buten-2-yl)-adenosine is directly crystallized from the resultant alcoholic solution.

(b) Analogously, a 40% yield of $N^6$-(3-chloro-cis-buten-2-yl)-adenosine, M.P. 157–158° C., is obtained from 1,3-dichloro-cis-butene-2 and adenosine.

Example 3

A solution of 26.7 g. of adenosine (0.1 mol) in 350 ml. of dimethylformamide is agitated at 80° C. under a nitrogen atmosphere for 96 hours with 25 g. of trans-1,3-dichlorobutene-2 (0.2 mol). The dimethylformamide is removed under vacuum and the residue is twice evaporated with water. The dark residue is allowed to stand in 500 ml. of concentrated ammonia for 48 hours at 24° C. and then refluxed for two hours with the occasional addition of a small amount of concentrated ammonia. After evaporation, the residue is extracted with a total of 2 l. of ethyl acetate, the extract is decolorized with carbon, and the residue, after dissolving in chloroform, is chromatographed on 80 g. of silica gel. There is eluted

4 with chloroform-methanol (99.5:0.5 to 99:1), 2.2 g. (6.2% of theory) of crystalline $N^6$-(3-chloro-trans-buten-2-yl)-adenosine (M.P. 159–161° C.).

Example 4

A homogeneous mixture was prepared from 5.0 g. of micronised $N^6$-(3-chlorobuten-2-yl)-adenosine, 45.0 g. of white petroleum jelly, 3198 g. of viscous paraffin oil, 15.0 g. of ceresine, 3.0 g. of hydrogenated castor oil and 0.02 g. of parfume oil. A colourless fatty ointment was obtained.

Example 5

Tablets were produced in conventional manner on a tablet pressing device having a diameter of 6 mm., a height of between 2.6 and 2.7 mm., a hardness of about 4 kp. (Stokes Test). Each tablet is composed of 100.0 mg. of $N^6$-(3-chloro-buten-2-yl)-adenosine, comminuted to a particle size of between 2 and 8 microns with only a small proportion of particles having a size of up to 16 microns, 70.0 mg. of lactose, 94.0 mg. of corn starch, 3.2 mg. of white gelatin, 10.0 mg. of talcum and 2.8 mg. of magnesium stearate. All of the constituents are of pharmaceutically acceptable purity. The lactose, corn starch, white gelatin and magnesium stearate serve as filling material. The tablet disintegrates in water at 20° C. in about 30 seconds.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Cis- and trans-isomers of $N^6$-(3-chlorobuten-2-yl)-adenosine of the formula

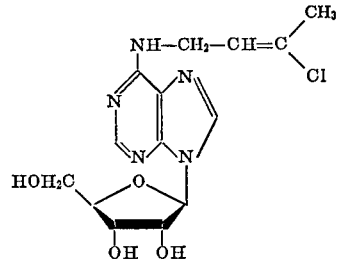

2. A compound of claim 1, $N^6$-(3-chloro-cis-buten-2-yl)-adenosine.

3. A compound of claim 1, $N^6$-(3-chloro-trans-buten-2-yl)-adenosine.

References Cited

UNITED STATES PATENTS 3,471,472   10/1969   Thiel et al. _____ 260—211.5 R
3,590,029   6/1971    Koch et al. _____ 260—211.5 R LEWIS GOTTS, Primary Examiner J. R. BROWN, Assistant Examiner U.S. Cl. X.R.

424—180